Aug. 23, 1938.  E. H. PICHA  2,127,751
SOD CUTTING TOOL
Filed June 14, 1937
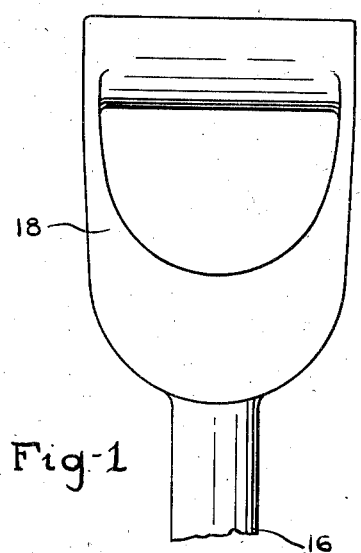
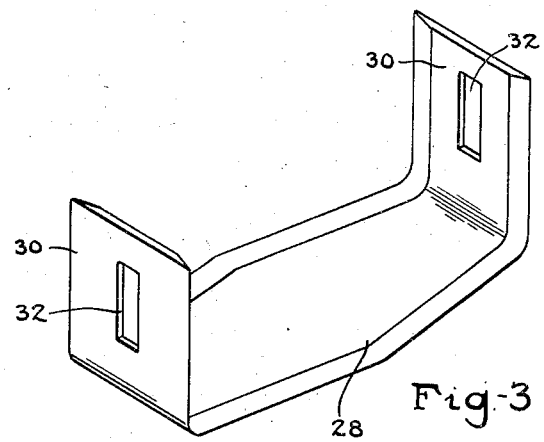
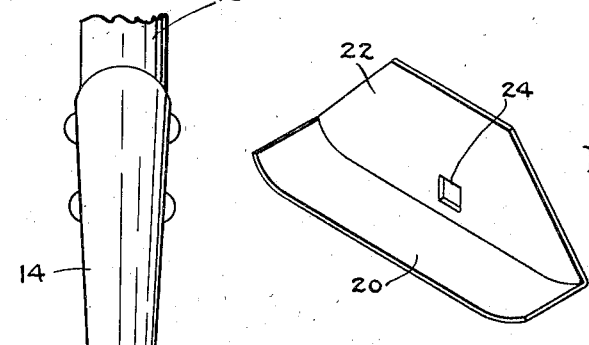
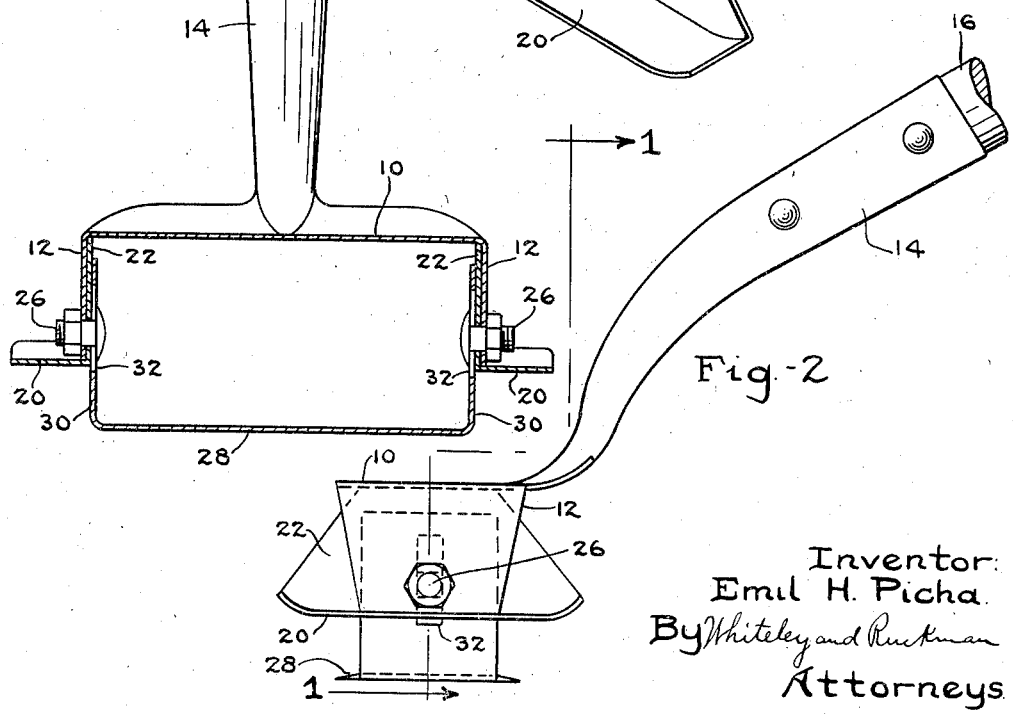
Inventor:
Emil H. Picha
By Whiteley and Ruckman
Attorneys Patented Aug. 23, 1938

2,127,751

UNITED STATES PATENT OFFICE 2,127,751

SOD CUTTING TOOL

Emil H. Picha, St. Paul, Minn.

Application June 14, 1937, Serial No. 148,016

2 Claims. (Cl. 97—226)

My invention relates to sod cutting tools. An object of the invention is to provide a tool of this character adapted to be easily manipulated in the hands of the operator so that it may be readily employed when it is desired to re-sod rather small portions of ground where it is not expedient to use an expensive power operated sod cutting machine. Another object is to provide a tool of this character which may be readily constructed and assembled. Another object is to provide a tool of this character in which provision is made for adjusting the depth of cut. Another object is to provide a tool having gauges at both of its sides whereby the predetermined depth of cut is maintained while the sod is being cut.

The novel features which I believe to be characteristic of my invention are set forth with particularity in the appended claims. The invention itself, however, both as to its organization and method of operation, together with additional objects and advantages thereof will be best understood from the following description of a specific embodiment when read in connection with the accompanying drawing in which, Fig. 1 is an elevational sectional view in which the sectional portion is on the line 1—1 of Fig. 2;

Fig. 2 is an elevational view at right angles to Fig. 1, the handle portion being broken away;

Fig. 3 is a perspective view of the cutting member;

Fig. 4 is a perspective view of one of the gauges.

In carrying out my invention, I provide a frame member consisting of a horizontal portion 10 the ends of which are turned downwardly to form vertical flanges 12 each of which is provided with a hole. The portion 10 carries a socket 14 for receiving the lower end of a handle 16 whose upper end is provided with a hand hold 18. The flanges 12 carry gauges in the form of shoes 20 which might be integral therewith but for convenience in manufacture are made separately with upwardly extending flanges 22 each of which is provided with a hole 24 through which a securing bolt 26 passes. As shown in Fig. 2, the shoes 20 extend forwardly and rearwardly beyond the flanges 12 to which they are attached and are provided with upwardly curved ends so that they will not dig into the ground. For cutting the sod, a cutting blade is provided which consists of a horizontal member 28 the ends of which are turned upwardly to form vertical flanges 30 which are provided with vertical slots 32. The cutting blade is sharpened at both its front and rear edges, and the horizontal member 28 is slightly V-shaped at both its front and rear edges as shown in Fig. 3. The distance between the flanges 30 is somewhat less than the distance between the flanges 12. In assembling the device, the flanges 22 of the gauges are placed inside of the flanges 12 of the frame while the flanges 30 of the cutting blade are placed inside of the flanges 22. The bolts 26 are then passed through the holes in the flanges 12 and 22 and through the slots 32 of the cutting blade. Upon turning down the nuts on the bolts, the cutting blade is firmly secured in adjusted position up or down for the desired depth of cut below the sod.

The operation and advantages of my invention will be readily understood in connection with the foregoing description and the accompanying drawing. Upon loosening the nuts on the bolts 26, the cutting blade may be adjusted up or down according to the desired depth of cut for the sod. Due to the fact that the cutting blade is sharpened on both its front and rear edges, the operator may use the tool either by pushing or pulling it along the ground. It is to be understood as a matter of course, that minor changes in construction may be made without departing from the spirit and scope of the invention as claimed.

I claim:

1. A sod cutting tool comprising a frame member consisting of a substantially flat horizontal plate having lateral end portions extending downwardly to form vertical flanges, said flanges being perforated, an operating handle extending rearwardly from said frame, two gauges having upwardly extending flanges provided with perforations, a blade consisting of a horizontal member having upwardly extending vertical flanges, said member and flanges having sharpened edges and said flanges being perforated, and a bolt at each side of the device passing through the perforations of said frame flanges, gauge flanges and blade flanges respectively.

2. A sod cutting tool comprising a frame member consisting of a substantially flat horizontal plate having lateral end portions extending downwardly to form vertical flanges, said flanges being perforated, an operating handle extending rearwardly from said frame, two gauges having upwardly extending flanges provided with perforations, a blade consisting of a horizontal member having upwardly extending flanges, said member and flanges having sharpened edges and said flanges containing vertical slots for adjusting purposes, and a bolt at each side of the device passing through the perforations of said frame flanges and gauge flanges and through the associated vertical slot of the blade flanges respectively.

EMIL H. PICHA.